United States Patent [19]
Kato et al.

[11] 3,875,255
[45] Apr. 1, 1975

[54] GRAFTING METHYL METHACRYLATE MONOMER INTO A EPOXY COPOLYMER BACKBONE

[75] Inventors: Yasuyuki Kato; Masahiko Moritani; Shuichi Konishi; Yoshiharu Tatsukami, all of Niihama, Japan

[73] Assignee: Sumitomo Chemical Company Limited, Osaka, Japan

[22] Filed: Mar. 20, 1973

[21] Appl. No.: 343,154

[30] Foreign Application Priority Data
Mar. 21, 1972 Japan.................................. 47-28737

[52] U.S. Cl............ 260/836, 260/42.28, 260/45.7 R
[51] Int. Cl............................................. C08g 30/00
[58] Field of Search ...................................... 260/836

[56] References Cited
UNITED STATES PATENTS
| | | |
|---|---|---|
| 3,297,621 | 1/1967 | Taft.................................. 260/2 EP |
| 3,645,952 | 2/1972 | Linderman et al. ............. 260/80.72 |
| 3,707,516 | 12/1972 | Walus.................................. 260/836 |

Primary Examiner—J. Murray Tillman
Assistant Examiner—J. Ziegler
Attorney, Agent, or Firm—Stevens, Davis, Miller & Mosher

[57] ABSTRACT

An impact resistant methyl methacrylate resin is obtained by polymerizing 40 to 99 percent by weight of an unsaturated monomer mixture (A) comprising (a) 50 to 100 percent by weight of methyl methacrylate and (b) 50 to 0 percent by weight of at least one unsaturated monomer copolymerizable with methyl methacrylate in the presence of 60 to 1 percent by weight of an ethylene copolymer (B) containing epoxy group.

8 Claims, No Drawings

GRAFTING METHYL METHACRYLATE MONOMER INTO A EPOXY COPOLYMER BACKBONE

This invention relates to a process for producing novel methyl methacrylate resins, and, more particularly, to a process for producing methyl methacrylate resins excellent in impact resistance, which comprises polymerizing methyl methacrylate in the presence of an ethylene copolymer.

Polymethyl methacrylate or a resin derived chiefly from methyl methacrylate is superior in mechanical properties and dimensional stability, and particularly in transparency, gloss, and weathering as compared with other resins, but is not satisfactory in impact strength, and rather ranks among brittle resins. Improvement in impact strength is, therefore, urgently required.

On the other hand, there has already been known a method for preparing a tough resin composition with high impact strength by incorporating generally a rubbery substance into a brittle resin. In the case of a methyl methacrylate resin, there is also known a method, in which methyl methacrylate resin is blended with a rubbery copolymer of butadiene as the rubbery substance for the purpose of improving the impact resistance, as disclosed in, for example, Japanese Pat. Publication No. 17,806/'68. However, such a method has a disadvantage of impairing the excellent weather-resistance of methyl methacrylate resins, which is one of the characteristic features thereof, because of increased susceptibility to degrading effect of light, owing to residual double bonds in the rubbery substance. In another known method, which makes use of a rubbery substance containing no residual double bond, an ethylene-vinyl acetate copolymer is used as the rubbery substance to be incorporated in the methyl methacrylate resin, as disclosed in Japanese Pat. Publication No. 2,466/'68. The resin composition obtained by this method, however, has such defects as unsatisfactory impact strength and a tendency to easily become cloudy when subjected to a minor stress, owing to phase separation resulting from poor compatibility of said ethylene copolymer with the methyl methacrylate resin.

In view of the existing situation of methyl methacrylate resins mentioned above, the present inventors have conducted extensive investigations in search of methyl methacrylate resin composition with good weatherability as well as good impact resistance, which would not easily undergo phase separation, and hence, not easily become cloudy under a stress. As a result, this invention has been accomplished. The essential feature of the invention consists in polymerizing by free radical mechanism methyl methacrylate monomer or a mixture of unsaturated monomers (A) containing predominantly methyl methacrylate in the presence of an ethylene copolymer (B) containing epoxy groups to produce a methyl methacrylate resin of excellent impact resistance.

The unsaturated monomer mixture (A) in this invention comprises (a) 50 to 100 percent by weight of methyl methacrylate and (b) 50 to 0 percent by weight of at least one unsaturated monomer copolymerizable with methyl methacrylate (the percentages by weight of these monomers are based on the total weight of the unsaturated monomer mixture). The unsaturated monomers copolymerizable with methyl methacrylate are desirably those which would not adversely affect the characteristics of the methyl methacrylate resin. Such an unsaturated monomer component copolymerizable with methyl methacrylate is usually used to improve various properties of the methyl methacrylate resin, that is, to increase, for example, melt fluidity or thermal resistance when the resin is being heated at the molding temperature.

Examples of unsaturated monomers copolymerizable with methyl methacrylate suitable for the above-mentioned purposes include acrylate esters such as methyl acrylate, ethyl acrylate, propyl acrylate, butyl acrylate, amyl acrylate, hexyl acrylate, octyl acrylate, 2-ethylhexyl acrylate, cyclohexyl acrylate, dodecyl acrylate, octadecyl acrylate, phenyl acrylate, and benzyl acrylate; methacrylate esters excepting methyl methacrylate such as ethyl methacrylate, propyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate, and benzyl methacrylate; vinyl halides such as vinyl chloride, vinyl bromide, vinyl fluoride, and vinylidene chloride; unsaturated nitriles such as acrylonitrile, methacrylonitrile, crotononitrile, and vinylidene cyanide; vinyl esters such as vinyl acetate, vinyl propionate, vinyl butyrate, vinyl benzoate, vinyl laurate, isopropenyl acetate, and isopropenyl caproate; styrene, α-methylstyrene and various halogen-substituted and alkyl-substituted styrene; vinyl ethers such as methyl vinyl ether, ethyl vinyl ether, propyl vinyl ether, butyl vinyl ether, amyl vinyl ether, hexyl vinyl ether, cyclohexyl vinyl ether, phenyl vinyl ether, and benzyl vinyl ether; allyl esters such as allyl acetate, allyl propionate, allyl laurate, allyl benzoate, methallyl acetate, and methallyl propionate; allyl ethers such as allyl methyl ether; compounds containing at least two unsaturated groups such as allyl acrylate, allyl methacrylate, crotyl acrylate, crotyl methacrylate, diallyl maleate, diallyl fumarate, ethylene glycol dimaleate, diallyl itaconate, methallyl acrylate, methallyl methacrylate, divinyl ether, diallyl ether, dimethallyl ether, ethylene glycol dimethacrylate, diethylene glycol dimethacrylate, triethylene glycol dimethacrylate, tetraethylene glycol dimethacrylate, 1,1,1-trimethoxypropane dimethacrylate, glyceryl triacrylate, diallyl phthalate, diallyl isophthalate, triallyl cyanurate, and divinylbenzene. These unsaturated monomers copolymerizable with methyl methacrylate can be used each alone or in admixture of two or more, and also include those unsaturated monomers which form, with methyl methacrylate, ternary or multicomponent copolymers, graft copolymers, and block copolymers.

The aforesaid ethylene copolymer (B), which is the other component used in this invention, contains 5 to 99.95 percent by weight of ethylene, 0.05 to 95 percent by weight of an unsaturated epoxy monomer, and 0 to 50 percent by weight of an unsaturated monomer copolymerizable with ethylene, and preferably has an intrinsic viscosity of 0.1 to 4.5 dl/g as measured in tetralin at 135°C. or a melt index (according to JIS K 6760-1966) of about 1,000 to 0.01. Those which contain less than 0.05 percent by weight of an unsaturated epoxy monomer will not substantially contribute to improvement in impact resistance, while those which contain more than 95 percent by weight will have an extremely poor compatibility.

The above-said ethylene copolymer (B) to be used in this invention may be prepared by several methods. An example of such methods comprises copolymerizing 5 to 99.95 percent by weight of ethylene, 0.05 to 95 percent by weight of one or more epoxy monomers, and 0 to 50 percent by weight of at least one other unsaturated monomer copolymerizable with ethylene (the percentages by weight of the monomers are based on the total weight of the unsaturated monomers), in the presence of 0.0001 to 1 percent by weight, based on the total weight of the monomers, of a radical polymerization initiator at a temperature of 40° to 300°C. under a pressure of 50 to 4,000 atmospheres. In another method, copolymerization is conducted in the presence of a modifier such as ethane, propane, or propylene. Alternatively, epoxy groups can be introduced into an ethylene copolymer obtained from ethylene and an unsaturated monomer copolymerizable therewith. One of the methods for introducing epoxy groups is alcoholysis of, for example, an ethyleneacrylate ester copolymer with a glycidyl ester. In carrying out alcoholysis, a suitable solvent such as toluene, xylene, or the like may be used, and, in addition, a suitable catalyst may be used to accelerate the exchange reaction. A mixture of two or more ethylene copolymers having different compositions can be used as the ethylene copolymer (B). Further, in order that the transparency of the methyl methacrylate resin of this invention should not be impaired, the ethylene copolymer (B) can be properly selected in composition so as to have the same refractive index as that of a methyl methacrylate resin derived from the unsaturated monomer mixture (A).

The unsaturated epoxy monomer as one of the members costituting the ethylene copolymer (B) in this invention is an unsaturated monomer having in its molecule one unsaturated bond copolymerizable with ethylene and, in addition, one or more epoxy groups. Examples of such compounds include unsaturated glycidyl esters represented by the general formula,

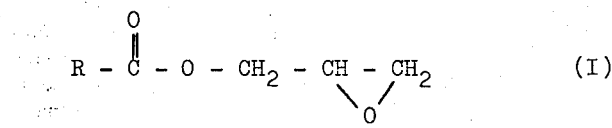

wherein R is an organic residue, such as a hydrocarbon group having one unsaturated bond; unsaturated glycidyl ethers represented by the general formula,

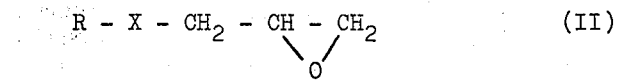

wherein R is the same as in the formula (I) and X is —CH$_2$ — O — or

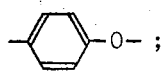

epoxyalkenes represented by the general formula,

wherein R is the same as in the formula (I) and R' is hydrogen or methyl group; and p-glycidylstyrene. Individual examples are glycidyl acrylate, glycidyl methacrylate, glycidyl crotonate, monoglycidyl itaconate, diglycidyl itaconate, monoglycidyl butenetricarboxylate, diglycidyl butenetricarboxylate, triglycidyl butenetricarboxylate, glycidyl p-styrenecarboxylate, allyl glycidyl ether, crotyl glycidyl ether, methallyl glycidyl ether, styrene-p-glycidyl ether, p-glycidylstyrene, 3,4-epoxybutene, 3,4-epoxy-3-methyl-1-butene, 3,4-epoxy-1-pentene, 3,4-epoxy-3-methylpentene, 5,6-epoxy-1-hexene, and vinylcyclohexene monoxide.

The unsaturated monomers copolymerizable with ethylene include α-olefines such as propylene, butene-1, decene-1, and octadecene-1; vinyl esters such as vinyl acetate, vinyl propionate, and vinyl benzoate; unsaturated carboxylic acids such as acrylic acid and methacrylic acid; acrylate esters such as methyl acrylate, ethyl acrylate, propyl acrylate, butyl acrylate, amyl acrylate, hexyl acrylate, octyl acrylate, 2-ethylhexyl acrylate, cyclohexyl acrylate, dodecyl acrylate, octadecyl acrylate, phenyl acrylate, and benzyl acrylate; methacrylate esters such as methyl methacrylate, ethyl methacrylate, propyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate, and benzyl methacrylate; maleic anhydride; mono- and diesters of maleic acid with saturated alcohols having 1 to 18 carbon atoms such as methyl, ethyl, butyl, cyclohexyl, 2-ethylhexyl, dodecyl, and octadecyl alcohols; vinyl halides such as vinyl chloride, vinyl bromide, vinyl fluoride, and vinylidene chloride; styrene, α-methylstyrene and various halogen-substituted and alkyl-substituted styrene; vinyl alkyl ethers such as vinly methyl ether and vinyl ethyl ether; N-vinylpyrrolidone and N-vinyllactams such as N-vinylcaprolactam; acrylamidetype compounds, methacrylamide-type compounds; secondary vinylcarboxylic acid amides; N-vinyl-N-alkylcarboxylic acid amide; and vinyl alkyl ketones such as vinyl methyl ketone. Of these unsaturated monomers copolymerizable with ethylene, vinyl acetate and acrylate esters are convenient for use.

For producing an excellent methyl methacrylate resin according to this invention, it is recommendable to use 60 to 1 percent, preferably 40 to 5 percent, by weight of the ethylene copolymer (B) with 40 to 99 percent, preferably 60 to 95 percent, by weight of the unsaturated monomer mixture (A) (the percentages by weight are based on the methyl methacrylate resin).

In polymerizing the unsaturated monomer mixture (A) in the presence of the ethylene copolymer (B) according to this invention, a well-known radical polymerization method such as bulk polymerization, suspension polymerization, emulsion polymerization, or solution polymerization is used. Such a radical polymerization is to be carried out at a desirable temperature, the most useful temperature range being 0° to 150°C. Suitable polymerization initiators for use are those which are capable of generating free radicals within the said temperature range and are soluble in either the unsaturated monomer mixture (A) to be used or water. Examples include azo compounds such as 2,2'-azobis(isobutyronitrile) and 2,2'-azo-bis-(2,4-dimethylvaleronitrile); benzoyl peroxide, lauroyl peroxide or other organic peroxides and hydroperoxides. Those polymerization initiators which are soluble in the unsaturated monomer mixture (A) are preferred in bulk polymerization and suspension polymerization, while water-soluble polymerization initiators, particularly persulfates and hydroperoxides such as hydrogen peroxide, are conveniently used in combination with a reducing agent such as sodium hydrogensulfite or a small amount of a heavy metal salt in emulsion polymerization. The amount of a polymerization initiator required to produce useful results is usually 0.01 to 5 percent by weight based on the unsaturated monomer mixture (A).

In order to control the polymerization degree of the resin obtained by polymerization, known polymerization chain-transfer agents, such as dodecyl mercaptan and other mercaptans and carbon tetrachloride, may be added at the beginning of polymerization or during the polymerization.

In solution polymerization, the organic compound for use as the solvent should not react with any of the unsaturated monomers and is selected desirably from those which have little or no chain transfer effect on the polymerization reaction.

In suspension polymerization, the unsaturated monomer mixture (A) is polymerized in the presence of the aforesaid ethylene copolymer (B) in a stirred polymerizer while being dispersed in water used as a medium, to which a suspension agent has preferably been added. Such suspension agents are well known to the suspension polymerization art and include, for example, gelatin, starch, poly-(sodium methacrylate), and partially hydrolyzed polyvinyl acetate or maleic anhydride copolymers.

The aforesaid ethylene copolymer (B) readily swells and dissolves in either the unsaturated monomer mixture (A) or an organic solvent or heating. When the aforesaid ethylene copolymer (B) is swollen and dissolved in the unsaturated monomer mixture (A), the resulting solution as such can be subjected to bulk polymerization or the solution can be transformed into another form suitable for polymerization under the conditions for emulsion or suspension polymerization. Alternatively, the unsaturated monomer mixture (A) containing the aforesaid ethylene copolymer (B) swollen and dissolved therein can be allowed to pass through a prepolymerization stage, where a part of the monomer mixture is polymerized, and the resulting polymer-containing solution is brought under the conditions for emulsion or suspension polymerization to complete the polymerization.

Bulk polymerization is carried out by a polymerization procedure known as casting. According to this procedure, the ethylene copolymer (B) is allowed to swell and dissolve in the unsaturated monomer mixture (A) to make a solution which is then poured into a mold (called a cell) constructed from two sheets of tempered glass used as the mold glass and a flexible gasket used to seal the four lateral faces of the glass mold, and subjected to casting polymerization in the presence of a radical initiator. After completion of the polymerization, the resin sheet is stripped from the mold glass.

Further, additives such as coloring agents, ultraviolet absorbers, thermal stabilizers, color stabilizers, plasticizers, and various fillers may be added at a convenient stage in the process of this invention.

The methyl methacrylate resin obtained according to this invention is excellent in weatherability, has little tendency toward phase separation, is not liable to become cloudy under a stress, and is outstanding in impact strength. Although the exact reason for such improvements, particularly that for diminished tendency toward phase separation, is not clear, it seems probable that the affinity between the ethylene copolymer (B) and the methyl methacrylate resin is so strong due to presence of epoxy groups that phase separation becomes difficult to take place. It is also possible that the epoxy group offers a starting site for grafting of the unsaturated monomer mixture (A), and that some form of chemical combination takes place between the aforesaid ethylene copolymer (B) and the methyl methacrylate resin. In any case, a methyl methacrylate resin having an excellent impact resistance can be produced according to this invention by use of an ethylene copolymer (B) containing epoxy groups as the rubbery substance.

The invention is illustrated below in further detail with reference to Examples, but the scope of the invention is not limited thereto. In the Examples, all parts and percentages are by weight.

Example 1

The air in a 260-ml stainless steel high pressure reactor equipped with a stirrer was repeatedly replaced with ethylene containing no oxygen. Into the reactor under reduced pressure, were charged 0.005 part of di-tert-butyl peroxide, 0.2 part of glycidyl methacrylate, and 13 parts of butyl acrylate. Then, ethylene was introduced into the reactor to a suitable pressure, and the internal stirrer was brought to action. Reaction was started at 150°C. (temperature of the reactor) under a pressure of 1,500 kg/cm$^2$. After 35 minutes of reaction, the reactor was cooled and released from the pressure to obtain 17.2 parts of a copolymer of ethylene, glycidyl methacrylate, and butyl acrylate. The weight ratio of ethylene, glycidyl methacrylate, and butyl acrylate in the copolymer was found to be 53 : 1 : 46 from the results of elementary analysis and the infrared absorption spectrum by reference to a calibration curve drawn on the basis of absorption at 1250 cm$^{-1}$ and 840 cm$^{-1}$ characteristic of the epoxy grouping. The copolymer had an intrinsic viscosity of 1.06 dl/g as measured in tetralin at 135°C.

Polymerization of methyl methacrylate was carried out using the above-obtained ethylene copolymer in the following manner:

In a 300-ml flask were placed 15 parts of the ethylene copolymer and 70 parts of methyl methacrylate. The ethylene copolymer was brought into solution by immersing the flask in an oil bath at 80°C. for 90 minutes. To the flask was added 15 parts of methyl methacrylate containing 0.3 part of dodecyl mercaptan and 0.7 part of benzoyl peroxide dissolved therein, followed by addition of an aqueous solution comprising 190 parts of water, 12 parts of a 1.2 percent aqueous poly-(sodium methacrylate) solution, and 0.4 part of sodium phosphate. The mixture in the flask was allowed to polymerize under a nitrogen stream at 80°C. for 3 hours, then at 100°C. for one hour tto obtain a methyl methacrylate resin. The resin had an Izod impact strength (notched) of 6.0 kg.cm/cm² according to ASTM D 256-56, and a Vicat softening point of 115.4°C. according to ASTM D 1525-65T.

For comparison, the Izod impact strength (notched) of a commercially available methyl methacrylate resin ("Sumipex-B MH," a registered trademark of Sumitomo Chemical Co.) was 1.0 kg.cm/cm² and the Vicat softening point of the same resin was 115.0°C.

The resin obtained in the present Example showed no sign of phase separation after one month.

Example 2

An ethylene copolymer comprising 70 percent of ethylene, 4 percent of glycidyl methacrylate, and 26 percent of butyl acrylate was obtained in a manner similar to that in Example 1, using a high pressure reactor. The copolymer had an intrinsic viscosity of 1.42 dl/g as measured in tetralin at 135°C.

In a manner similar to that in Example 1, 85 parts of methyl methacrylate containing 15 percent of the ethylene copolymer was polymerized to yield a methyl methacrylate resin which had an Izod impact strength (notched) of 7.8 kg.cm/cm², and a Vicat softening point of 109.8°C. The resin showed no sign of phase separation after 1 month.

For comparison, two ethylene copolymers of ethylene and butyl acrylate in the weight ratio of 69 : 31 and 52 : 48, respectively were obtained in a manner similar to that in Example 1, without using glycidyl methacrylate. The intrinsic viscosities of the copolymers were 1.15 dl/g and 1.06 dl/g, respectively. The methyl methacrylate resins containing each 15 percent of the respective ethylene copolymers had Izod impact strength (notched) of 2.4 kg.cm/cm² and 3.4 kg.cm/cm², respectively. Within one week both resins showed phase separation and marked clouding.

Example 3

Copolymerization of ethylene was carried out using a 50-liter stainless steel reactor provided with suitable inlet and outlet devices, a stirrer, and a temperature controlling device, under the following feeding and polymerization conditions:

Feed:
    Glycidyl acrylate,     1.3 kg/hr.
    Vinyl acetate,     90 kg/hr.
    Ethylene,     200 kg/hr.
Polymerization:
    Pressure,     2600 kg/cm²
    Temperature,     160°C.
    Capryl peroxide, catalyst,     5 g/hr.

The resulting ethylene copolymer had a composition of 49 percent of ethylene, 6 percent of glycidyl acrylate, and 45 percent of vinyl acetate, and had a melt index of 60 g/10 minutes according to JIS K 6760 - 1966.

Using varied amounts of the above-obtained ethylene copolymer, several methyl methacrylate resins were obtained in a manner similar to that in Example 1. Properties of the resins obtained were as shown in Table 1.

For comparison, methyl methacrylate resins were prepared in a manner similar to that mentioned above, by use of an ethylene-vinyl acetate copolymer ("Evatate R 5011," registered trade mark, produced by Sumitomo Chemical Co.; vinyl acetate content, 45 percent; melt index, 60 g/10 min.), which contained no glycidyl acrylate. Properties of the resulting resins were as shown also in Table 1.

Table 1

| Type of ethylene copolymer | Ethylene copolymer content of methyl methacrylate resin, % | Izod impact strength (notched), kg.cm/cm² |
|---|---|---|
| EVA containing 6% of GA* | 10 | 3.1 |
| " | 20 | 6.0 |
| " | 30 | 10.7 |
| EVA without containing GA | 10 | 1.9 |
| " | 20 | 4.6 |
| " | 30 | 7.8 |

Note:
*GA: glycidyl acrylate
EVA: ethylene-vinyl acetate copolymer

It is seen from Table 1 that a methyl methacrylate resin having an excellent impact strength and no tendency toward phase separation may be obtained when an ethylene copolymer containing glycidyl acrylate is used.

Example 4

By a procedure similar to that in Example 3 using a 50-liter high pressure reactor, an ethylene copolymer comprising 63.5 percent of ethylene, 1.5 percent of glycidyl methacrylate, and 35 percent of methyl acrylate was obtained. The melt index of the copolymer was 300 g/10 min. Using the ethylene copolymer thus obtained, polymerization of methyl methacrylate was carried out in the following manner.

In a 3-liter flask were placed 75 parts of the ethylene copolymer and 350 parts of methyl methacrylate. The ethylene copolymer was brought into solution at 80°C. within 90 minutes. Then, to the flask was added 62 parts of methyl methacrylate containing 0.85 parts of 2,2'-azobis(isobutyronitrile), 0.8 parts of dodecyl mercaptan, and 13 parts of ethyl acrylate, followed by adding an aqueous solution containing 702 parts of water, 45.8 parts of a 1.2 percent aqueous poly-(sodium methacrylate) solution, and 1.4 parts of sodium phosphate. The mixture in the flask was allowed to polymerize under a nitrogen stream at 80°C. for 3 hours, then at 100°C. for one hour.

The resulting methyl methacrylate resin had an impact strength (notched) of 4.0 kg.cm/cm² and a Vicat softening point of 108.6°C.

Example 5

Using the ethylene copolymer obtained in Example 4, polymerization of methyl methacrylate was carried out in the following way.

In a 3-liter flask were placed 75 parts of the ethylene copolymer and 320 parts of methyl methacrylate, and the mixture was stirred at 80°C. for 90 minutes. Then, to the flask was added 30 parts of methyl methacrylate containing 0.08 part of 2,2'-azobis(isobutyronitrile), 0.8 part of dodecyl mercaptan, and 13 parts of ethyl acrylate. The mixture in the flask was allowed to polymerize under a nitrogen stream at 80°C. for 2 hours (at this point of time 27 percent of methyl methacrylate was found polymerized according to analysis). Then, 62 parts of methyl methacrylate containing 0.77 part of 2,2'-azobis(isobutyronitrile) was added, followed by addition of an aqueous solution similar to that used in Example 4. Polymerization was allowed to proceed to completion by heating at 80°C. for 3 hours and then at 100°C. for one hour, under a nitrogen stream.

The resulting methyl methacrylate resin had an impact strength (notched) of 5.3 kg.cm/cm$^2$, and a Vicat softening point of 110.2°C.

Example 6

Following the procedure in Example 1 and by use of a high pressure reactor, an ethylene copolymer comprising 65 percent of ethylene, 1 percent of allyl glycidyl ether, and 34 percent of butyl acrylate was obtained, which had an intrinsic viscosity of 1.53 dl/g as measured in tetralin 1 at 135°C.

In a manner similar to that in Example 1, 85 parts of methyl methacrylate containing 15 percent of the aboveobtained ethylene copolymer was polymerized to yield a methyl methacrylate resin which had an Izod impact strength (notched) of 3.9 kg.cm/cm$^2$ and a Vicat softening point of 110.9°C.

Example 7

Following the procedure used in Example 1 and by use of a high pressure reactor, an ethylene copolymer comprising 51 percent of ethylene, 4 percent of glycidyl methacrylate, and 45 percent of butyl acrylate was obtained. The copolymer had an intrinsic viscosity of 1.32 dl/g as measured in tetralin at 135°C.

In a manner similar to that in Example 1, 85 parts of methyl methacrylate containing 15 percent of the said ethylene copolymer was polymerized to give a methyl methacrylate resin having an Izod impact strength (notched) of 11.9 kg.cm/cm$^2$ and a Vicat softening point of 117.8°C.

Example 8

Following the procedure of Example 1 and by use of a high pressure reactor, an ethylene copolymer comprising 50 percent of ethylene, 5 percent of glycidyl methacrylate, 25 percent of ethyl acrylate and 20 percent of styrene was obtained. The copolymer had an intrinsic viscosity of 0.6 dl/g as measured in tetralin at 135°C.

Using the above-obtained ethylene copolymer, methyl methacrylate was polymerized in the following manner:

In a 300 ml flask were charged 10 parts of the ethylene copolymer and 90 parts of methyl methacrylate, and the mixture was stirred at 80°C. for 2 hours. Then, to the flask was added 0.64 part of benzoyl peroxide. The mixture was allowed to polymerize under a nitrogen stream for 2 hours while maintaining the temperature at 80°C. (at this point of time 26 percent of the methyl methacrylate was found polymerized from analytical results). Then, to the flask was added 0.2 part of dodecyl mercaptan, followed by adding an aqueous solution comprising 94 parts of water, 6 parts of a 1.2 percent aqueous poly-(sodium methacrylate) solution, and 0.2 part of sodium phosphate. Polymerization was allowed to proceed to completion by heating at 80°C. for 3 hours, and then at 100°C. for one hour, to obtain a methyl methacrylate resin.

The resin had an Izod impact strength (notched) of 2.5 kg.cm/cm$^2$ and a Vicat softening point of 91.8°C. Optical properties of the resin measured according to ASTM D 1003 -61 were as follows: total luminous transmittance, 82 percent; haze, 15 percent.

Example 9

Following the procedure of Example 1 and by use of a high pressure reactor, an ethylene copolymer comprising 53.4 percent of ethylene, 6.6 percent of glycidyl methacrylate, 23 percent of ethyl acrylate, and 17 percent of styrene was obtained. The copolymer had an intrinsic viscosity of 0.6 dl/g as measured in tetralin at 135°C.

Using the above-said ethylene copolymer, bulk polymerization of methyl methacrylate was carried out in the following manner:

In a homogeneous solution prepared from 10 parts of the ethylene copolymer and 90 parts of methyl methacrylate was dissolved 0.1 part of 2,2'-azobis(isobutyronitrile). After having been freed from the dissolved air under reduced pressure, the solution was poured into a cell made up of two sheets of tempered glass separated by 3 mm by an elastic gasket placed along the edges of the glass sheets. Polymerization was allowed to proceeds at 57°C. for 15 hours, at 80°C for 3 hours, and then at 115°C. for 2 hours, to obtain a cast sheet of methyl methacrylate resin.

The case sheet thus obtained had following characteristics: Izod impact strength (notched), 3.9 kg.cm/cm$^2$; Vicat softening point, 104.0°C.; total luminous transmittance, 84 percent; haze, 21 percent. The sheet showed no discoloration on a weathering test extending to 500 hours in Sunshine Weather-O-Meter.

What is claimed is:

1. A process for producing an impact resistant methyl methacrylate resin, which comprises polymerizing 40 to 99 percent by weight of (A) an unsaturated monomer mixture comprising (a) 50 to 100 percent by weight of methyl methacrylate and (b) 50 to 0 percent by weight of at least one unsaturated monomer copolymerizable with methyl methacrylate, the percentage by weight of these monomers being based on the total weight of the unsaturated monomers, in the presence of 60 to 1 percent by weight of (B) an ethylene copolymer containing 5 to 99.95 percent by weight of ethylene, 0.05 to 95 percent by weight of one or more unsaturated epoxy monomers, and 0 to 50 percent by weight of at least one other unsaturated monomer copolymerizable with ethylene.

2. An impact resistant methyl methacrylate resin prepared by a method as claimed in claim 1.

3. A process according to claim 1, wherein the polymerization is carried out by radical polymerization methods.

4. The process of claim 1 wherein said unsaturated monomer copolymerizable with methyl methacrylate is selected from the group consisting of vinyl halides, unsaturated nitriles, styrenes, allyl acrylate, allyl methacrylate, crotyl acrylate, crotyl methacrylate, diallyl maleate, diallyl fumarate, ethylene glycol dimaleate, diallyl itaconate, methallyl acrylate, methallyl methacrylate, divinyl ether, diallyl ether, dimethallyl ether, ethylene glycol dimethacrylate, diethylene glycol dimethacrylate, triethylene glycol dimethacrylate, tetraethylene glycol dimethacrylate, 1,1,1-trimethoxypropane dimethacrylate, glyceryl triacrylate, diallyl phthalate, diallyl isophthalate, triallyl cyanurate, and divinylbenzene and mixtures thereof.

5. The process of claim 1, wherein said ethylene copolymer has an intrinsic viscosity of 0.1 to 4.5 dl/g as measured in tetralin at 135°C. or a melt index of about 1,000 to 0.01.

6. A process according to claim 5, wherein the unsaturated epoxy monomer is selected from the group consisting of unsaturated glycidyl esters, unsaturated glycidyl ethers, epoxyalkenes and p-glycidylstyrene.

7. A process according to claim 5, wherein the unsaturated monomer copolymerizable with ethylene is selected from the group consisting of vinyl acetate and acrylate esters.

8. A process according to claim 5, wherein the unsaturated monomer copolymerizable with ethylene is selected from the group consisting of alpha olefins, vinyl esters of saturated acids, unsaturated carboxylic acids, acrylate esters of saturated alcohols, methacrylate esters of saturated alcohols, maleic anhydride, mono- and di-esters of maleic acid with saturated alcohols having 1 to 18 carbon atoms, vinyl halides, styrene, halogen-substituted and alkyl-substituted styrenes, vinyl alkyl ethers, N-vinyl lactams and vinyl alkyl ketones.

\* \* \* \* \*